United States Patent [19]

Sherman

[11] Patent Number: 5,674,075

[45] Date of Patent: Oct. 7, 1997

[54] MATH TEACHING UNIT

[76] Inventor: Betty E. Sherman, P.O. Box 196, Buford, Ga. 30518

[21] Appl. No.: 726,738

[22] Filed: Oct. 7, 1996

[51] Int. Cl.$^6$ .................................. G04F 3/00
[52] U.S. Cl. .................. 434/188; 434/191; 434/201; 434/209; 434/394
[58] Field of Search .................. 434/188, 189, 434/191, 198, 201, 202, 209, 308, 309, 317, 322, 323, 335, 365, 394

[56] References Cited

U.S. PATENT DOCUMENTS

| D. 244,587 | 6/1977 | Molyneux et al. |  |
|---|---|---|---|
| 4,114,294 | 9/1978 | Marmer | 434/201 |
| 4,321,046 | 3/1982 | Oda et al. | 434/201 |
| 4,340,375 | 7/1982 | Sakaue et al. | 434/201 |
| 5,167,507 | 12/1992 | Cobb et al. |  |
| 5,219,289 | 6/1993 | Dean . |  |
| 5,318,447 | 6/1994 | Mooney . |  |
| 5,380,206 | 1/1995 | Aspney . |  |
| 5,420,830 | 5/1995 | Camaratt, Jr. et al. |  |

*Primary Examiner*—Richard J. Apley
*Assistant Examiner*—Glenn E. Richman
*Attorney, Agent, or Firm*—David L. Volk

[57] ABSTRACT

A digital clock display and a math display are disposed on a surface of a math teaching unit. A processing unit is configured to display time including an hour and a minute on the digital clock display based on control signals from a clock circuit and a clock setting apparatus. The processing unit is configured to display math equations on the math display such that a first operand equals the hour and a second operand equals the minute.

6 Claims, 2 Drawing Sheets

MATH TEACHING UNIT

BACKGROUND OF THE INVENTION

1. Field of the Invention

The present invention relates to electronic devices, specifically to a teaching device which accepts, processes and displays data.

2. Description of the Related Art

Learning multiplication tables or improving math skills is critical to the education and development of children and adults alike. Presently, there are many electronic devices available for teaching various math skills. These devices require an interactive involvement between the user and the device. Generally, the unit must be turned on, and the user must press keys to try and solve math problems shown on a display. Even though these devices often involve clever math games in an attempt to keep a child's interest, sometimes a child becomes bored with these devices. The child may become so disinterested in the device, that he or she rarely takes the initiative to turn it on and use it.

What is needed is a device that does not need to be turned on, and that constantly updates a display of math problems with the answers. If such a device were incorporated together with a device that is commonly seen, such as a clock in a child's room, such a device would be a teaching tool that builds math skills throughout the day as it is observed. If the device included other features which permit interaction with the device, the child would have the option of teaming with the device in a more active way.

SUMMARY OF THE INVENTION

The math teaching unit of the present invention includes a digital clock display and a math display disposed on a surface thereof. A processing unit is configured to display time including an hour and a minute on the digital clock display based on control signals from a clock circuit and a clock setting apparatus. The processing unit is configured to display math equations on the math display such that a first operand equals the hour and a second operand equals the minute.

Accordingly, several objects and advantages of the present invention are:

a. to provide a math teaching unit that does not require extra initiative on the part of the user, because it does not need to be mined on and because it continually updates a display of math problems with answers;

b. to provide a math teaching unit that provides a unique, interesting way of learning math through repeated casual observation because of its integration with a clock; and c. to provide a math teaching unit that gives a child the option of learning in an active way, because the device includes features which permit interaction with the device.

Still further objects and advantages will become apparent from the ensuing description and drawings.

DETAILED DESCRIPTION

Figure 1:
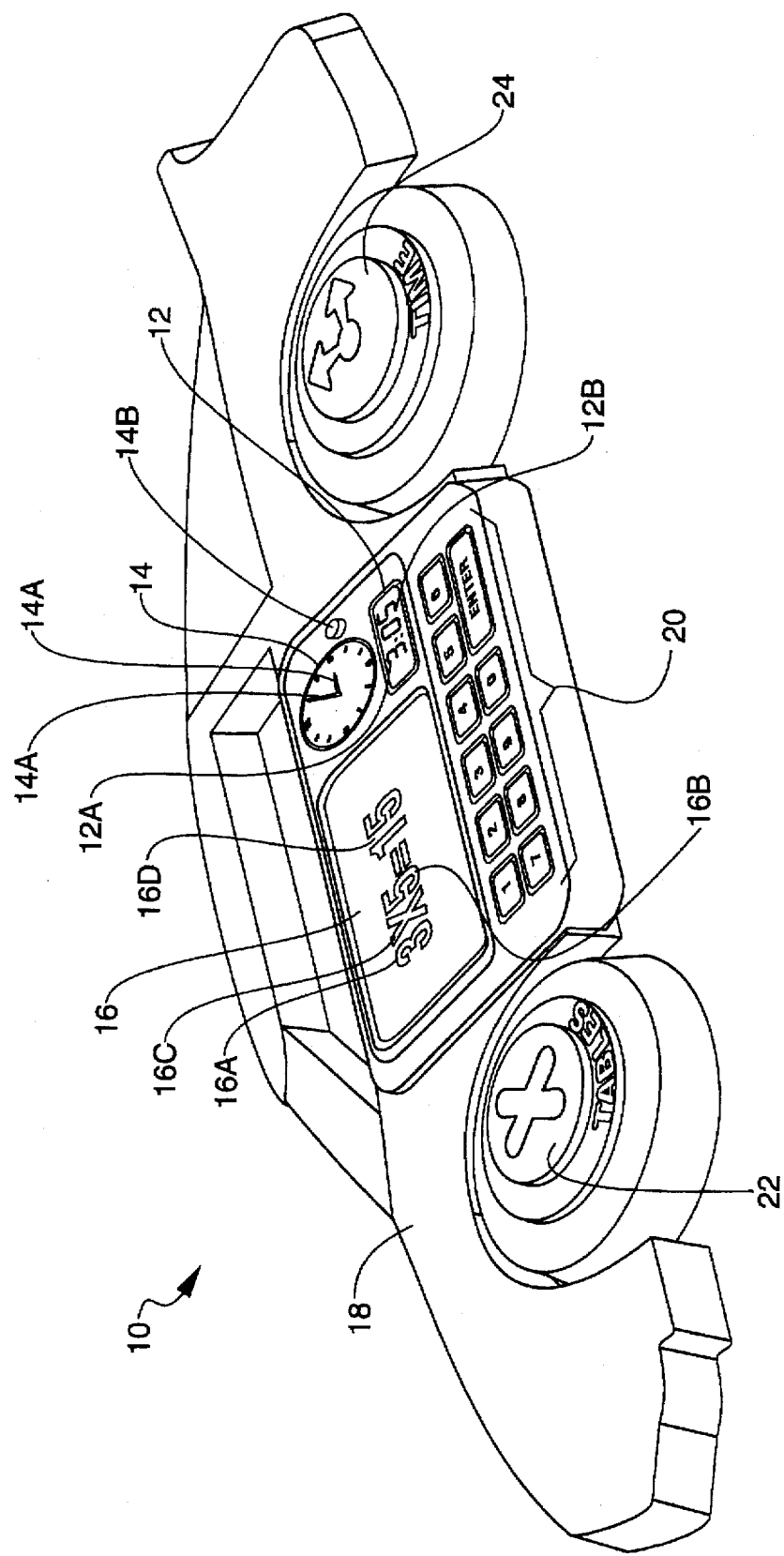
FIG. 1 is a perspective view of the math teaching unit.

FIG. 1 is a perspective view of a math teaching unit 10. In the embodiment shown, the teaching unit has the appearance of a car. Any type of appearance is within the scope of the present invention. For example, the teaching unit 10 could be made to resemble an animal, a basket, or the like.

The teaching unit 10 includes a digital clock display 12, an analog clock display 14 with hands 14A, and a math display 16 on the surface 18 thereof. The teaching unit 10 further includes a keypad 20, a tables button 22, and a clock set button 24 on the surface 18 thereof. The clock set button 24 is for setting the digital clock display 12. A knob 14B on the surface 18 of the teaching unit 10 is configured to reset the hands 14A of the analog clock display 14.

Figure 2:
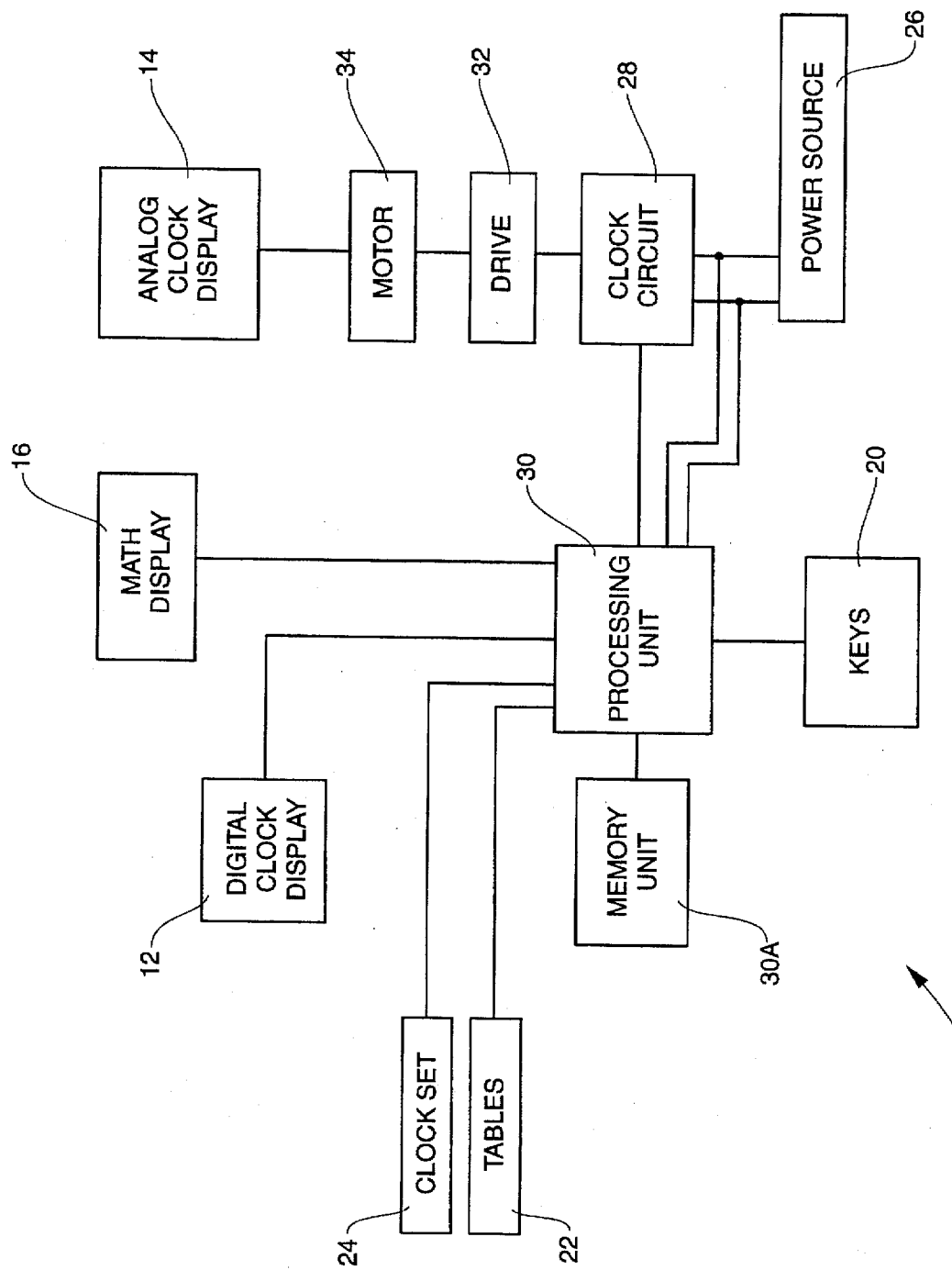
FIG. 2 is a block schematic diagram of the math teaching unit.

FIG. 2 is a block schematic diagram of the teaching unit 10. A power source 26 is electrically connected to a clock circuit 28 and to a processing unit 30 to provide power thereto. The power source 26 may be: a battery; or a power cord adapted for connection to an alternating current power outlet, and an AC-DC converter.

The clock circuit 28 includes a quartz oscillator (not shown), capacitor (not shown), microchip frequency divider (not shown), and electronic circuitry (not shown) in a standard configuration well known in the art of time piece manufacture to provide a control signal every second to a drive 32 to drive a motor 34 which turns the hands 14A (FIG. 1) of the analog clock display 14. The drive 32 may be a coil (not shown) which powers an electromagnet (not shown) to drive the motor 34 in a standard configuration well known in the art of time piece manufacture.

The clock circuit 28 is further configured to provide a control signal every second to the processing unit 30, simultaneously with the control signal sent to the drive 32. The processing unit 30 includes a memory unit 30A to store information for processing.

The processing unit 30 is configured to set the digital clock display 12 when the clock set button 24 is pressed. As with many clocks of the prior art, the digital clock display 12 will advance forward when the clock set button 24 is pressed, and will stop advancing when the clock set button 24 is released. The processing unit 30 processes the control signals from the clock circuit 28 to calculate the time and to store the time in the memory unit 30A, and to advance the time displayed on the digital clock display 12 in a standard manner well known in the art, and to change the math display 16.

The math display 16, based on signals received from the processing unit 30, displays math equations corresponding to the time displayed on the digital clock display 12. Referring to FIG. 1, the math display 16 shows the hour 12A as the first operand 16A of the equation and the minute 12B as the second operand 16B of the equation. An operator 16C may be any mathematical operator such as a plus sign, minus sign, division sign or a multiplication sign as shown. The math display also displays the result 16D of the equation. The math display 16 automatically updates every minute as the digital clock display 12 updates. The processing unit 30 is configured to perform all of the functions necessary to generate the math equations and the results 16D and to transmit them to the math display 16.

A mode switch (not shown) may be included on the math teaching unit 10 to change the type of operator 16C used in the equation.

The processing unit 30, tables button 22, and keypad 20 are configured to perform the following functions which permit interactive use of the math teaching unit 10:

a. when the table button 22 is pressed, the processing unit 30 causes the math display 16 to display a math equation which does not necessarily correspond to the digital clock display 16; the math display 16 does not display the answer to the equation;

b. the processing unit 30 displays a number entered on the keypad 20 to the right of the equals sign on the math display 16, and compares the number entered to the actual answer of the math equation;

c. if the number entered is the actual answer of the math equation, the math display 16 displays an appropriate message, such as "CORRECT", and then displays a new math equation and goes back to step 'b' above;

d. if the number entered is the wrong answer, the math display 16 displays an appropriate message, such as "INCORRECT", and then displays a new math equation and goes back to step 'b' above;

e. when the table button 22 is pressed again, the math display 16 once again displays math equations corresponding to the time kept in the memory unit 30A and displayed on the digital clock display 12.

The teaching unit 10 may be configured to rest in an upright manner on a flat surface, and may include a hanging means for hanging on a wall.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. For example, various other well known configurations of electronic circuitry and components to accomplish the functions described herein are possible and within the scope of the present invention. The scope of the invention is to be limited only by the following claims and their legal equivalents.

The invention claimed is:

1. A math teaching unit comprising:

a. a digital clock display and a math display disposed on a surface thereof;

b. a clock circuit;

c. a processing unit;

d. a clock setting means;

e. the processing unit configured to display time including an hour and a minute on the digital clock display based on control signals from the clock circuit and the clock setting means; and f. the processing unit configured to display math equations on the math display such that a first operand equals the hour and a second operand equals the minute.

2. The math teaching unit of claim 1, further including a switching means for signaling the processing unit to display math equations which do not necessarily correspond to the hour and the minute displayed on the clock display, and a keypad configured to input answers to the math equations to the processing unit.

3. The math teaching unit of claim 1, further including a switching means for signaling the processing unit to display math equations which do not include results thereto, and a keypad configured to input information to the processing unit.

4. The math teaching unit of claim 1, further including a switching means for ending display of math equations having first and second operands corresponding to the hour and the minute, and a keypad configured to input information to the processing unit.

5. The math teaching unit of claim 1, wherein the unit is configured to be powered by a battery.

6. The math teaching unit of claim 1, wherein the unit is configured to be powered by an alternating current power source.

* * * * *